United States Patent [19]

Horvath

[11] Patent Number: 4,556,686

[45] Date of Patent: Dec. 3, 1985

[54] STABLE CROSSLINKED DISPERSION

[75] Inventor: Stanley K. Horvath, Rochester, Mich.

[73] Assignee: Ford Motor Company, Dearborn, Mich.

[21] Appl. No.: 746,942

[22] Filed: Jun. 20, 1985

Related U.S. Application Data

[63] Continuation of Ser. No. 600,204, Apr. 16, 1984, abandoned, which is a continuation of Ser. No. 200,222, Oct. 23, 1980, abandoned.

[51] Int. Cl.$^4$ .......................... C08K 5/10; C08K 3/10; C08L 61/00; C08L 51/00
[52] U.S. Cl. .................... 524/315; 524/317; 524/364; 524/413; 524/501; 524/505; 524/504; 524/512; 524/517; 524/531; 525/66; 525/77; 525/92; 525/155; 525/167; 525/286; 525/298; 525/299; 523/333; 523/334
[58] Field of Search ............... 524/315, 501, 504, 507, 524/512, 517, 531, 364; 523/333, 334; 525/66, 77, 92, 155, 167, 286, 298, 299

[56] References Cited

U.S. PATENT DOCUMENTS

| | | | |
|---|---|---|---|
| 3,607,821 | 9/1971 | Clarke | 260/34.2 |
| 3,966,667 | 6/1976 | Sullivan et al. | 260/312 N |
| 4,002,699 | 1/1977 | Cabana et al. | 525/155 |
| 4,025,474 | 5/1977 | Porter et al. | 260/22 CQ |
| 4,055,607 | 10/1977 | Sullivan et al. | 260/30.4 EP |
| 4,065,518 | 12/1977 | Labana et al. | 525/286 |
| 4,075,141 | 2/1978 | Porter et al. | 260/17.2 |
| 4,115,472 | 9/1978 | Porter et al. | 260/53.6 B |
| 4,147,688 | 4/1979 | Makhlauf et al. | 260/33.6 EP |
| 4,180,489 | 12/1979 | Andrew et al. | 260/70 |
| 4,241,196 | 12/1980 | Chattha | 525/162 |
| 4,340,511 | 7/1982 | Backhouse | 524/512 |

Primary Examiner—Herbert J. Lilling
Attorney, Agent, or Firm—Roger L. May; Keith L. Zerschling

[57] ABSTRACT

Improved stable crosslinked dispersion which is further stabilized with butylated melamine formaldehyde resin. The dispersion to which the improvement of the invention applies is formed by addition polymerization of selected monomers in the presence of an organic liquid which is a solvent for the monomers, but a non-solvent for the polymer and a polymeric dispersion stabilizer having solvated and non-solvated segments.

14 Claims, No Drawings

STABLE CROSSLINKED DISPERSION

This application is a continuation of Ser. No. 600,204 filed Apr. 16, 1984, now abandoned, which, in turn, is a continuation of Ser. No. 200,222 filed Oct. 23, 1980, now abandoned.

BACKGROUND OF THE INVENTION

This invention relates to stable crosslinked dispersions containing microgel particles. More particularly, the invention relates to stable crosslinked dispersions which are prepared by addition polymerization of (a) first and second ethylenically unsaturated monomers each bearing functionality capable of crosslinking with the other and (b) at least one other monoethylenically unsaturated monomer, in the presence of (I) organic liquid which is a solvent for the polymerizable monomers, but a non-solvent for the resultant polymer and (II) a polymeric dispersion stabilizer containing at least two segments of which one segment is solvated by said organic liquid and a second segment which is of a different polarity than said first segment and is relatively insoluble in said organic liquid. Still more particularly, the invention relates to such stable crosslinked dispersions, wherein the dispersion is further stabilized by an additional stabilizer which, except for solvents, consists essentially of butylated melamine formaldehyde resin.

Stable crosslinked dispersions of the type to which the improvement of this invention applies are well known. Such stable crosslinked dispersions containing microgel particles are taught by U.S. Pat. No. 4,147,688 to Makhlouf et al. That patent teaches crosslinked dispersions wherein crosslinked acrylic polymer microgel particles are formed by free radical addition polymerization of alpha, beta ethylenically unsaturated monocarboxylic acids, at least one other copolymerizable monoethylenically unsaturated monomer and a certain percentage of crosslinking monomer, in the presence of a hydrocarbon dispersing liquid (See abstract, examples and claims). Other crosslinked dispersions containing microgel particles are disclosed in the patent application and patents referred to in the Maklouf et al disclosure.

U.S. Pat. No. 4,025,474 to Porter et al discloses a polyester based coating composition which includes the crosslinked dispersions disclosed by Makhlouf et al. U.S. Pat. No. 4,075,141 to Porter et al disclose carboxylic acid amide interpolymer—based coating compositions including the same crosslinked dispersions. U.S. Pat. No. 4,115,472, also to Porter et al, discloses urethane coating compositions also including the crosslinked dispersions of Makhlouf et al. U.S. Pat. No. 4,055,607 to Sullivan et al discloses thermosetting compositions of (a) solution acrylic polymer, (b) at least 0.5% of microgel particles formed by polymerizing hydroxyl bearing monomers with nonhydroxyl bearing monomers in the presence of the stabilizer disclosed by Makhlouf et al, and (c) melamine resin. The microgel dispersion of Sullivan et al thus contains functionality capable of reacting with the melamine crosslinking agent.

The dispersion stabilizer employed in producing the microgel particles of the Makhlouf et al compositions are generally polymeric and contain at least two segments, with one segment being solvated by the dispersing liquid and the second segment being of different polarity than the first segment and relatively insoluble, compared to the first segment, in the dispersing medium. Included among the dispersion stabilizers referred to in the Makhlouf et al patent are polyacrylates and methacrylates, such as poly (lauryl) methacrylate and poly (2-ethylhexylacrylate); diene polymers and copolymers such as polybutadiene and degraded rubbers; aminoplast resins, particularly high naphtha-tolerant compounds such as melamine formaldehyde resins etherified with higher alcohols (e.g alcohols having 4 to 12 carbon atoms); and various copolymers designed to have desired characteristics (see Col. 5, lines 1–27).

Among the numerous dispersion stabilizers which could be employed in compositions of Makhlouf et al and which are suitable for compositions to which the improvement of this invention may be applied, are those taught by U.S. Pat. No. 3,607,821 to Clarke. Clarke teaches a stabilizer for non-aqueous dispersions wherein the stabilizer is chemically reacted with dispersed particles of the dispersion (Col. 1, lines 36–42). Each coreactant stabilizer molecule forms from 1 to 10 (preferably 1 to 4) covalent links with the dispersed polymer (Col. 1, lines 50–52). The covalent links between the stabilizer and the dispersed polymer are formed by reaction between chemical groups provided by the stabilizer and complementary chemical groups provided by the dispersed polymer or by copolymerization reaction (Col. 1, lines 63–67).

Particularly preferred dispersion stabilizers of Makhlouf et al and the stabilizers employed in compositions of the preferred type to which the improvement of this invention applies are those which are graft copolymers comprising two polymeric segments with one segment being solvated by the dispersing liquid and usually not associated with polymerized particles of the polymerizable ethylenically unsaturated monomers and the second segment being an anchor polymer of different polarity from the first type and relatively non-solvatable by the hydrocarbon solvent and capable of anchoring with the polymerized particles of the ethylenically unsaturated monomer. This anchor polymer segment contains pendent groups capable of copolymerizing with the ethylenically unsaturated monomers of the dispersion (See Col. 5, lines 28–40 of Makhlouf et al).

One of the serious disadvantages of the aforementioned prior art types of crosslinked dispersions containing microgel particles is their lack of stability, both alone and when employed in other compositions. It has been found that the shelf stability of such crosslinked dispersions is not sufficient to allow shipment and storage of these materials for reasonable periods of time before they are employed without the compositions suffering from separation and settling. Furthermore, it has been found that when such compositions are employed in coating compositions as additives, such as a flow control additive, they tend to settle out and separate from the composition, thus creating a viscosity and "kickout" problem. The crosslinked dispersions to which the invention applies are particularly desirable as flow control additives in those compositions in which metallic flake is employed as a pigment in as much as they afford improved metallic pigment control. Of course, when such additives settle and separate from the composition, the advantages insofar as the pigment control features are concerned, are seriously diminished.

It has been found that by further stabilizing the crosslinked dispersions by addition of butylated melamines in accordance with the teachings of the subject invention, the aforementioned problems can be effectively eliminated, thus providing a stable crosslinked dispersion which does not suffer from separation or settling problems whether on the shelf or incorporated into coating compositions such as thermosetting enamels used for automotive applications.

U.S. Pat. No. 4,425,450, issued to Stanley K. Horvath and assigned to Ford Motor Company discloses and claims compositions incorporating the stabilized crosslinked compositions of this invention as a flow control additive. U.S. Pat. No. 4,425,450 discloses and the above Continuation-In-Part application discloses claims paint compositions comprising hydroxy function, film former crosslinked by an appropriate crosslinking agent and containing the improved stable crosslinked dispersions of this invention as a flow control additive preferred embodiments of the compositions claimed are intermediate and high solids paint compositions. The intermediate solids paint compositions comprise a film forming component comprising a hydroxy functional copolymer having a number average molecular weight ($M_n$) greater than 5,000 and a specified hydroxy functional monomer percentage, a butylated melamine formaldehyde crosslinking agent and a flow control additive comprising the improved stable crosslinked dispersion of this invention. The claimed high solids paint composition comprises a film forming component consisting essentially of a hydroxy functional copolymer having a number average molecular weight ($M_n$) of between about between about 1,500 and about 5,000, a specified hydroxy functional monomer percentage and a specified amount of alpha-beta olefinically unsaturated carboxylic acid, a crosslinking agent comprising methylated melamine formaldehyde and a flow control additive comprising the improved stable crosslinked dispersion of this invention.

BRIEF DESCRIPTION OF THE INVENTION

The crosslinked dispersions of the type to which the improvement of this invention applies are those which are formed by addition polymerization of (a) first and second ethylenically unsaturated monomers each bearing functionality capable of crosslinking reaction with the other and (b) at least one other monoethylenically unsaturated monomer, in the presence of (I) organic liquid which is a solvent for the polymerizable monomers, but a non-solvent for the resultant polymer, and (II) a polymeric dispersion stabilizer. The polymeric dispersion stabilizer, as described above in the discussion of the prior art, in its broadest sense contains at least two segments, with one segment being solvated by the organic liquid and the second segment being of different polarity than the first segment and relatively insoluble in the organic liquid. The crosslinked dispersion is prepared by carrying out the addition polymerization at a elevated temperature such that the dispersion polymer is first formed and then crosslinked.

The improvement of the invention comprises including in the crosslinked dispersion a further stabilizer which, except for solvents, consists essentially of a butylated melamine formaldehyde resin having a number average molecular weight in the range of about 700 to about 2,500. This further stabilizer is included in the crosslinked dispersion in an amount ranging from about 25 to about 75 parts of resin solids per 100 parts of total resin solids in a crosslinked dispersion.

DETAILED DESCRIPTION OF THE INVENTION

The improvement of the invention comprises further stabilization of crosslinked dispersions containing microgel particles as described above. The improvement is effected by adding to the crosslinked dispersions a further stabilizer which, except for any solvent present in the stabilizer composition, consists essentially of butylated melamine formaldehyde resin having a number average molecular weight in the range of from about 700 to about 2,500. This stabilizer is included in the crosslinked dispersion in an amount ranging from about 25 to about 75 parts, preferably from about 40 to about 60 parts, of resin solids per 100 parts of total resin solids in the crosslinked dispersion. Preferably the further stabilized dispersion of the invention has a solids level after addition of the further stabilizer and any additional solvent that may be desired in the range of 30 to 70 percent, most preferably in the range of 40 to 60 percent. Generally the further additive will be added to the crosslinked dispersion as a solution comprising one or more solvents for the butylated melamine formaldehyde resin. Preferably the further stabilizer should consist essentially of a solution of butylated melamine formaldehyde resin in an organic solvent in an amount such that the percentage solids of the butylated melamine formaldehyde resin in the solvent ranges from about 50 to about 90 percent. In a particularly preferred embodiment the further stabilizer consists essentially of a 65 percent solids solution of the butylated melamine formaldehyde resin in a 2 to 1 solution of butyl acetate and butyl alcohol.

Suitable butylated melamine formaldehyde resins for use as the further stabilizing additive of the invention are those prepared by condensation of melamine, formaldehyde and butyl alcohol either in a one step process under acidic conditions or in a two step process in which the melamine and formaldehyde are reacted under basic conditions followed by etherification under acidic conditions. The molecular weight is governed by the ratios of the three components. High ratios of formaldehyde to melamine and high ratios of alcohol to formaldehyde tend to yield lower molecular weight resin. The molar ratio of formaldehyde to melamine ranges from about 3.0 to 6, while the molar ratio of butanol to melamine may range from 6 to 12. Only a portion of the alcohols react and the remainder acts as a solvent. Molecular weight distributions are generally wide, with the $M_w$ range being from about 2,000 to about 10,000 and the $M_n$ ranging as stated above.

The crosslinked dispersions of microgel particles to which the improvement of this invention applies are prepared by addition polymerization of (a) between about 1 and about 10 mole percent, preferably between about 2 and about 5 mole percent, each of first and second ethylenically unsaturated monomers, each bearing functionality capable of crosslinking with the other and (b) between about 80 and about 98 mole percent, preferably between about 90 and about 96 mole percent, of at least one other monoethylenically unsaturated monomer. The addition polymerization is carried out in the presence of an organic liquid which is a solvent for the polymerizable monomers, but a non-solvent for the resultant polymer and in the presence of the aforementioned polymeric dispersion stabilizer.

The crosslinking functionalities on the first and second ethylenically unsaturated monomers (A) in this type of microgel dispersion can be selected from a wide variety of functionalities which will be apparent to those skilled in the art. Among the preferred pairs of crosslinking functionalities which may be present on the first and second ethylenically unsaturated monomers are: acid and epoxide; epoxide and amine; acid anhydride and hydroxyl; acid anhydride and amine; acid anhydride and mercaptan; isocycanate and hydroxyl; hemiformal and amide; carbonate and amine; cycloimide and amine; cycloimide and hydroxyl; imine and alkoxysilane; etc.

While the first and second ethylenically unsaturated monomers (a) may be any ethylenically unsaturated monomer within the scope of such term (i.e., any monomer which bears ethylenic unsaturation, including doubly unsaturated monomers such as butadiene and which is capable of polymerizing in vinyl-type manner), it is preferred that the monomers by acrylic monomers (i.e., monomers based on acrylic, methacrylic or ethacrylic acids).

A preferred class of crosslinked dispersions within the scope of the invention is formed by free radical addition copolymerization, in the presence of the polymeric dispersion stabilizer and in the presence of a hydrocarbon dispersing liquid of: from about 1 to about 10, preferably from about 2 to about 5, mole percent of alpha, beta ethylenically unsaturated monocarboxylic acid; from about 80 to about 98, preferably from about 90 to about 96, mole percent of at least one other copolymerizable monoethylenically unsaturated monomer; and from about 1 to about 10, preferably from about 2 to about 5, mole percent of a crosslinking monomer selected from the group consisting of ethylenically unsaturated monoepoxides. The preferred alpha, beta ethylenically unsaturated monocarboxylic acids for use in this class of crosslinked dispersions are acrylic acid and methacrylic acid, with methacrylic acid being especially preferred.

Various other monoethylenically unsaturated monomers may be copolymerized with the acid monomer in the preparation of this class of crosslinked dispersion. Although essentially any copolymerizable monoethylenically unsaturated monomer may be utilized, depending upon the properties desired, the preferred monoethylenically unsaturated monomers are the alkyl esters of acrylic or methacrylic acid, particularly those having about 1 to about 4 carbons in the alkyl group. Representative of such compounds are: alkyl acrylates, such as methylacrylate, ethylacrylate, propylacrylate and butylacrylate and the alkyl methacrylates, such as methylmethacrylate, ethylmethacrylate, propylmethacrylate and butylmethacrylate. Other ethylenically unsaturated monomers which may be advantageously employed include, for example, the vinyl aromatic hydrocarbons, such as styrene, alpha-methylstyrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

Although numerous ethylenically unsaturated monoepoxides will come to the mind of those skilled in the art, representative of the most preferred monoepoxides for this class of crosslinked dispersions to which the improvement of this invention applies are glycidyl acrylate and glycidyl methacrylate.

In a particularly preferred crosslinked dispersion embodiment within the aforementioned class, the monomers used in the addition copolymerization to form the dispersed polymer are characterized in that the alpha, beta ethylenically unsaturated monocarboxylic acid is methacrylic acid, the other copolymerizable monoethylenically unsaturated monomer is methylmethacrylate and the crosslinking monomer is glycidyl methacrylate.

As discussed above, the polymeric dispersion stabilizer of the crosslinked dispersions to which the improvement of this invention applies are generally those containing at least two segments, with one segment being solvated by the dispersing liquid and the other being of different polarity than the first segment and relatively insoluble in the dispersing liquid. Various types of such polymeric dispersion stabilizers are discussed in the aforementioned Makhlouf et al patent, the disclosure of which is hereby incorporated by reference. Preferred types of stable crosslinked dispersions to which the improvement of the invention applies are those in which the dispersion stabilizer is a graft copolymer containing two polymeric segments with one segment being solvated by the dispersing liquid and the second segment being an anchor polymer of different polarity than the first segment and relatively non-solvatable by the dispersing liquid. Such preferred polymeric dispersion stabilizers contain pendent groups which react with the ethylenically unsaturated monomers in the copolymerization process used to make the crosslinked dispersion. Preferably such chemical reaction is by way of addition copolymerization with the ethylenically unsaturated monomers through ethylenic unsaturation on the polymeric dispersion stabilizer. A particularly preferred stable crosslinked dispersion to which the improvement of the invention applies is that in which the polymeric dispersion stabilizer is of the aforementioned preferred graft copolymerized type which is formed by graft copolymerizing the reaction product of glycidyl methacrylate and poly (12-hydroxystearic acid) with methylmethacrylate and glycidyl methacrylate and reacting the resulting copolymer product containing pendent epoxy groups with methacrylic acid, thus adding ethylenic unsaturation to the stabilizer. It is this ethylenic unsaturation which allows the dispersion stabilizer to take part in the addition polymerization used in the preparation of the crosslinked dispersion.

This preferred type of dispersion stabilizer is preferably made by a four-step process which is accomplished in two sequential batches. The additive itself is prepared using the stabilizer in a manner which is similar to well known non-aqueous dispersion processing. First, hydroxystearic acid is self-condensed to form poly (12-hydroxystearic acid) a linear polyester having a terminal carboxyl group on one end and a terminal hydroxyl group on the other. This carboxyl terminated linear polyester (1 mole) is reacted with glycidyl methacrylate (1 mole). The glycidyl functionality reacts with the terminal carboxyl functionality to form an ester linkage, a hydroxyl group and terminal ethylenic unsaturation. This "macromonomer" (1 mole) is then reacted by free radical polymerization with methylmethacrylate (14.6 moles) and a small amount of glycidyl methacrylate (1.41 moles) to form the graft copolymer. This graft copolymer (1.41 epoxy equivalents) is then modified by reacting the epoxy group present from the polymerized glycidyl methacrylate with methacrylic acid (0.43 moles), thus providing a graft copolymer with vinyl groups or "hooks" extending from the methylmethacrylate backbone.

Preparation of this particularly preferred type of dispersion stabilizer used in preparing crosslinked dispersions to which the improvement of the invention applies will be more fully understood from the following detailed examples which are merely exemplary of the multitude of compositions which fall within the scope of this invention.

EXAMPLE 1

Preparation of Stabilizer

Hydroxystearic acid (2300 gms.) and xylene (255 gms.) are heated together in a reaction vessel fitted with a condenser and a water separator. The mixture is heated at reflux (begins at 170° C. and continues to rise with the removal of the by-product water to 198° C.) until the acid number reaches 37.5. The maximum reaction temperature is kept below 200° C. to prevent substantial amounts of dehydration, a secondary reaction to the desired esterification reaction. After 13 hours, the desired acid number is reached, removing 92 ml. of water layer. (Acid equivalent weight = 1500).

The polyhydroxystearic acid prepared above (2455 gms.) is charged to a reactor fitted with a stirrer and reflux condensor. Glycidyl methacrylate (240 gms.), hydroquinone (2.1 gm.) and dimethyl dodecylamine (4.1 gms.) were added at 50° C. and heated to 130° C. After six hours, the acid number was reduced from 34.0 to 1.3. An oxygen sparge was introduced into the reactor throughout the entire reaction time. The reaction product was reduced with 1223 grams of butyl acetate. The macromonomer, thus produced, had a viscosity of A-Al (Gardner-Holdt) at 61.5% NV.

The glycidyl methacrylate polyhydroxystearic acid product solution described above (1365 gms.) was combined with methyl methacrylate (744 gms.), glycidyl methacrylate (102 gms.) and azobis isobutyronitrile (AIBN) (35.4 gms.). This solution was added, dropwise to a refluxing (123° C.) solution of butyl acetate (591 gms.), xylene (135 gms) and AIBN (2.7 gms.) over a four and one-half hour period. The resultant copolymer solution was refluxed for an additional one hour, a solution of AIBN (4.0 gms.) in butyl acetate (84 gms.) was added, and the solution refluxed for an additional 2.0 hours. A solution of hydroquinone (2.7 gms.) in butyl acetate (60 gms.) was added and reflux continued for 0.5 hour. Methacrylic acid (12.1 gms.), dimethyl dodecylamine (0.75 gms.) and butyl acetate (20 gms.) were added. The reaction solution was refluxed for 3.5 hours at 125° C. The acid number was reduced to 1.0. The solution had a solids content of 55%.

EXAMPLE 2

Crosslinked Dispersion

A reactor, filled with a stirrer and a reflux condensor, was charged with methyl methacrylate (14 gms.), stabilizer from Example 1 (2.5 gms.), heptane (340 gms.) and AIBN (0.2 gms.). The solution was refluxed 0.5 hours (95° C.) and then a solution of

| | |
|---|---|
| methyl methacrylate | 348 grams |
| methacrylic acid | 12 grams |
| glycidyl methacrylate | 20 grams |
| stabilizer from Example 1 | 50 grams |
| dimethyl dodecylamine | 1.2 grams |
| octyl mercaptan | 2.3 grams |
| AIBN | 2.3 grams |
| VM & P Naptha | 150 grams | was added, at reflux, over a 4.5 hour period. A booster catalyst of 0.2 grams AIBN in 50 grams of butyl acetate was added and reflux continued for 2.5 hours. The dispersion had a 28 second viscosity (#4 Ford Cup) at 44% NV.

EXAMPLE 3

Further Stabilization of Crosslinked Dispersion

The dispersion prepared in Example 2 was mixed with a butylated melamine formaldehyde resin in the following proportions:

Dispersion 556 parts
Melamine Resin A* 385 parts
Isopropyl Acetate 59 parts

*Melamine Resin A is a commercially available resin (Syn U Tex 4113E, Celanese) which is 65% nonvolatile in a 2/1 blend of butyl acetate/butyl alcohol. The viscosity of the 65% solution is a W (Gardner-Holdt).

The mixture was a milky white dispersion with a viscosity of 42 seconds in a #2 Ford Cup. The mixture remained a stable dispersion for one month. The mixture filtered easily through 10 micron mesh bags.

EXAMPLES 4–11

Further stabilization in accordance with the invention of the dispersion of Example 2 and comparison with such a dispersion not stabilized in accordance with the invention is illustrated in the following table.

| | | Example | | | | | | | |
|---|---|---|---|---|---|---|---|---|---|
| | % NV | 4 | 5 | 6 | 7 | 8 | 9 | 10 | 11 |
| Dispersion of Example 2 | 44 | 556 | 556 | 556 | 556 | 556 | 556 | 631 | 454 |
| Cymel 325 | 80 | 313 | | | | | | | |
| Cymel 1158 | 80 | | 313 | | | 313 | 313 | | |
| Syn-U-Tex 4113E | 65 | | | 385 | | | | 285 | 462 |
| Acrylic Resin A | 80 | | | | 313 | | | | |
| Methyl Ethyl Ketone | | | | | | 131 | | | |
| Methyl Amyl Ketone | | 131 | 131 | 59 | 131 | | | | |
| Isopropyl Acetate | | | | | | | | 131 | 84 | 84 |
| Stability | | Poor | Exc. | Exc. | Poor | Exc. | Exc. | Exc. | Exc. |

Cymel 325 is a methylated melamine formaldehyde resin available from American Cyanamid
Cymel 1158 is a butylated melamine formaldehyde resin available from American Cyanamid
Acrylic Resin A is a 68/30/2 butyl methacrylate hydroxyethyl acrylate/acrylic acid copolymer of Mn = 2400 in methyl amyl ketone.

EXAMPLE 12

A white enamel was prepared from the following ingredients:

| | |
|---|---|
| Acrylic Resin G | 2862 parts |

| -continued | |
|---|---|
| Melamine Resin A (See Example 3) | 1174 parts |
| Crosslinked Dispersion of Example 3 | 744 parts |
| White Millbase* | 3423 parts |
| Cellosolve Acetate | 348 parts |
| Isopropylalcohol | 1044 parts |
| Titanium dioxide | 600 parts |
| Acrylic Resin D | 250 parts |
| VM & P Naphtha | 110 parts |
| Methyl Amyl Ketone | 50 parts |
| Butyl Acetate | 40 parts |
| Toluene | 40 parts |
| Xylene | 8 parts |

*The white millbase is prepared by mixing

Acrylic Resin G is an acrylic copolymer of 30/30/20/18/2 styrene/butyl methacrylate/ethylhexylacrylate/hydroxypropyl methacrylate/acrylic acid composition. The resin has a T viscosity at 50% solids in 1/1 methylamyl ketone/VM&P Naphtha.

Acrylic Resin D is an acrylic copolymer of 28/30/20/20/2 styrene/butyl methacrylate/ethylhexylacrylate/hydroxypropyl methacrylate/acrylic acid. The resin has a T viscosity at 60% solids in 1/1 methyl amyl ketone/VM&P Naptha.

In view of the disclosure, many modifications of this invention will be apparent to those skilled in the art. It is intended that all such modifications which fall within the true scope of this invention be included within the terms of the appended claims.

What is claimed is:

1. A stable crosslinked dispersion containing microgel particles, said dispersion being:
   (i) formed by addition polymerization of
      (a) between about 1 and about 10 mole percent each of first and second ethylenically unsaturated monomers, each bearing functionality capable of crosslinking reaction with the other, and
      (b) between about 80 and about 98 mole percent of at least one other monoethylenically unsaturated monomer
   in the presence of (I) a hydrocarbon dispersing liquid which is a solvent for the polymerizable monomers, but a non-solvent for the resultant polymer, and (II) polymeric dispersion stabilizer containing at least two segments, with one segment being solvated by said dispersing liquid and the second segment being of different polarity than said first segment and relatively insoluble in said dispersing liquid, wherein the reaction is carried out at elevated temperature such that the dispersion polymer first forms and then is crosslinked; and
   (ii) stabilized further by inclusion therein of a further stabilizer which, except for solvent, consists essentially of butylated melamine formaldehyde resin have a number average molecular weight in the range of about 700 to about 2,500, said further stabilizer being included in said crosslinked dispersion in an amount ranging from about 25 to about 75 parts of resin solids per 100 parts total resin solids in said crosslinked dispersion.

2. A crosslinked dispersion in accordance with claim 1 wherein said further stabilizer is included in said crosslinked dispersion in an amount ranging from about 40 to about 60 parts of resin solids per 100 parts of total resin solids in said crosslinked dispersion.

3. A crosslinked dispersion in accordance with claim 1 wherein said crosslinked dispersion including said further stabilizer contains between about 30 and about 70 percent solids.

4. A stable crosslinked dispersion in accordance with claim 1 wherein said polymeric dispersion stabilizer is a graft copolymer containing two polymeric segments, with one segment being solvated by said dispersing liquid and the second segment being an anchor polymer of different polarity than said first segment and relatively non-solvatable by said dispersing liquid, and wherein said polymeric dispersion stabilizer contains pendent groups which have been addition copolymerized with the ethylenically unsaturated monomers in the copolymerization process.

5. A stable crosslinked dispersion in accordance with claim 4 wherein said polymeric dispersion stabilizer is formed by graft copolymerizing the reaction product of glycidyl methacrylate and poly(12-hydroxystearic acid) with methylmethacrylate and glycidyl methacrylate and then reacting the resulting copolymer product containing pendent epoxy groups with methacrylic acid.

6. A stable crosslinked dispersion in accordance with claim 1 wherein the functionalities of said first and second ethylenically unsaturated monomers used to form the dispersed polymer of said dispersion respectively are selected from the group consisting of: (a) acid and epoxide; (b) epoxide and amine; (c) acid anhydride and hydroxyl; (d) acid anhydride and amine; (e) acid anhydride and mercaptan; (f) isocyanate and hydroxyl; (g) hemiformal and amide; (h) carbonate and amine; (i) cycloimide and amine; (j) cycloimide and hydroxyl; and (k) imine and alkoxysilane.

7. A stable crosslinked dispersion in accordance with claim 6 wherein said dispersion liquid is an aliphatic hydrocarbon solvent and said first and second ethylenically unsaturated monomers (a) and said at least one other ethylenically unsaturated monomer (b) used in the preparation of said dispersed polymer are acrylic monomers.

8. A stable crosslinked dispersion in accordance with claim 6 wherein said dispersion is formed by free radical addition copolymerization in the presence of hydrocarbon dispersing liquid of from about 2 to about 5 mole percent of alpha, beta ethylenically unsaturated monocarboxylic acid, from about 90 to about 96 mole percent of at least one other copolymerizable monoethylenically unsaturated monomer and from about 2 to about 5 mole percent of crosslinking monomer selected from the group consisting of ethylenically unsaturated monoepoxides.

9. A stable crosslinked dispersion in accordance with claim 8 wherein said monomers used in the addition copolymerization to form said dispersed polymer are characterized in that said alpha, beta ethylenically unsaturated monocarboxylic acid is methacrylic acid, said other copolymerizable monoethylenically unsaturated monomer is methylmethacrylate and said crosslinking monomer is glycidyl methacrylate.

10. A stable crosslinked dispersion containing microgel particles said dispersion being:
   (i) formed by addition polymerization of between about 1 and about 10 mole percent of alpha, beta ethylenically unsaturated monocarboxylic acid, from about 80 to about 98 mole percent of at least one other copolymerizable monoethylenically unsaturated monomer and from about 1 to about 10 mole percent of crosslinking monomers selected from the group consisting of ethylenically unsaturated monoepoxides, in the presence of (I) a hydrocarbon dispersing liquid which is a solvent for the polymerizable monomers, but a non-solvent for the resultant polymer, and (II) polymeric dispersion stabilizer containing at least two segments, with one segment being solvated by said dispersing liquid and the second segment being of different polarity than said first segment and relatively insoluble in said dispersing liquid, said polymeric dispersion stabilizer being formed by graft copolymerizing the reaction product of glycidyl methacrylate and poly(12-hydroxystearic acid) with methylmethacrylate and glycidyl methacrylate and reacting the resulting copolymer product containing pendent epoxy groups with methacrylic acid, wherein the reaction is carried out at elevated temperatures such that the dispersion polymer first forms and then is crosslinked; and (ii) stabilized further by inclusion therein of a further stabilizer which, except for solvent, consists essentially of butylated melamine formaldehyde resin have a number average molecular weight in the range of about 700 to 2,500, said further stabilizer being included in said crosslinked dispersion in an amount ranging from about 25 to about 75 parts of resin solids per 100 parts of total resin solids in said crosslinked dispersion.

11. A stable crosslinked dispersion in accordance with claim 10 wherein said further stabilizer is included in said crosslinked dispersion in an amount ranging from about 40 to about 60 parts resin solids per 100 parts of total resin solids in said crosslinked dispersion.

12. A stable crosslinked dispersion in accordance with claim 10 wherein said crosslinked dispersion including said further stabilizer contains between about 30 and about 70 percent solids.

13. A stable crosslinked dispersion in accordance with claim 10 wherein said further stabilizer consists essentially of a solution of butylated melamine formaldehyde resin in organic solvent in an amount such that the percentage solids of said butylated melamine formaldehyde resin in said hydrocarbon solvent ranges from about 50 to about 90 percent.

14. A stable crosslinked dispersion in accordance with claim 13 wherein said further stabilizer consists essentially of a 65 percent solids solution of said butylated melamine formaldehyde resin in a 2/1 solution of butylacetate and butyl alcohol.

* * * * *